United States Patent [19]

Kearns et al.

[11] Patent Number: 5,223,287
[45] Date of Patent: Jun. 29, 1993

[54] DRIED FRUITS AND CEREAL COMBINATIONS THEREOF

[75] Inventors: Joyce M. Kearns, New City; Fouad Z. Saleeb, Pleasantville, both of N.Y.

[73] Assignee: Kraft General Foods, Inc., Northfield, Ill.

[21] Appl. No.: 935,068

[22] Filed: Aug. 25, 1992

[51] Int. Cl.$^5$ ................................................ A23B 7/10
[52] U.S. Cl. ........................................ 426/102; 426/74; 426/640
[58] Field of Search .............. 426/639, 640, 655, 102, 426/74

[56] References Cited

U.S. PATENT DOCUMENTS

| | | | |
|---|---|---|---|
| 4,256,772 | 3/1981 | Shanbhag et al. | 426/331 |
| 4,350,711 | 9/1982 | Kahn et al. | 426/102 |
| 4,364,968 | 12/1982 | Waitman et al. | 426/639 |
| 4,390,550 | 6/1983 | Kahn | 426/639 |
| 4,515,822 | 5/1985 | Kraig | 426/640 |
| 4,547,376 | 10/1985 | Silver | 426/639 |
| 4,551,348 | 11/1985 | O'Mahony | 426/639 |
| 4,562,085 | 12/1985 | Ruggiero | 426/639 |
| 4,626,434 | 12/1986 | O'Mahony | 426/639 |
| 4,654,222 | 3/1987 | Fuller | 426/457 |
| 4,713,252 | 12/1987 | Ismail | 426/639 |
| 4,767,630 | 8/1988 | Silver | 426/102 |
| 4,961,943 | 10/1990 | Blanthorn | 426/102 |
| 5,000,972 | 3/1991 | Nafise-Movaghar | 426/102 |

*Primary Examiner*—Carolyn Paden
*Attorney, Agent, or Firm*—Linn I. Grim

[57] ABSTRACT

Improved dried fruits having improved handling and physical properties are provided by coating the fruits with a finely divided specially prepared calcium citrate reaction product. Also included is the combination of these improved dried fruits with dry cereals.

37 Claims, No Drawings

DRIED FRUITS AND CEREAL COMBINATIONS THEREOF

FIELD OF THE INVENTION

This invention relates to improved dried fruits and particularly to new dried fruit products having improved properties initially and upon storage. Additionally, the invention includes the combination of these dried fruits with dry cereals.

BACKGROUND OF THE INVENTION

There is a long history of the desirability of and necessity for dried fruit products. Many of these products are simply dried under naturally occurring sunny conditions, such as raisins and other fruits are dried under controlled industrial conditions to protect the color, flavor and texture of the products. The known commercial processes leave much to be desired in terms of handling, processing and the ability of the products so dried to remain desirably soft and natural looking over extended periods of time with minimal changes in color and flavor. Several techniques are known to obtain dried fruits having highly desirable softness properties. One such technique is the infusion of dried fruits with sugar.

U.S. Pat. No. 4,350,711 entitled "Methods of Infusing Fruits" issued Sep. 21, 1982 describes methods for incorporating sugar solids such as fructose to provide a soft and edible consistency even at freezing temperatures. U.S. Pat. No. 4,364,968 entitled "Process for Preparing a Dried Grape Product" describes a dehydration technique wherein grapes are immersed in an aqueous hydrophillic carbohydrate solution such as fructose, glycerol, corn syrup and the like having a concentration effective to provide significant osmotic withdrawal of water, removing the excess solution and drying to develop a natural raisin-like flavor. Although these dried fruit products as described provide satisfactory products, there is a significant disadvantage in the handling of these products because on storage these products tend to clump and on standing can further dehydrate losing softness properties as well as flavor properties.

U.S. Pat. No. 4,256,772 entitled "Fruit and Cereal Products and Process Therefor" issued Mar. 17, 1981, describes improved shelf stable breakfast foods containing dried fruits by equilibrating the moisture content of the cereal particles with the fruit by infusion with an aqueous solution of edible polyhydric alcohol and sugar. After the infused fruit is dried it is dusted with a moisture binder such as finely ground corn, tapioca or potato starch. This is a complicated procedure and on standing, clumping and further dehydration of the product occurs The combination of dried fruit and cereal provides extensive problems in storage. Major among the problems encountered with dehydrated fruits for use as an admix with dry cereal is that of texture, flavor and avoiding the moisture of the fruit causing a soggy cereal. Generally in order to have a satisfactory degree of stability, it is the usual practice to dehydrate the fruits to a level whereat they are hard and have a tough fibrous structure and texture.

There remains a present need for the capability of treating dried fruits so that the dried fruit products retain more of their natural flavor and in dried condition remain soft, flavorful and a good color for extended periods of time. There also remains a need for a process which will enable the control of flavor and texture so that unique variations in the nature of the dried fruit product can be made as desired. Another problem is the handling of dried fruits which tend to clump when stored for extended periods of time. This problem creates excessive tie-ups in the use of the dried fruit in production operations requiring special handling to break up the clumps of fruit.

SUMMARY OF THE INVENTION

The present invention provides an improved dried fruit product and cereal combinations thereof. The improved food product of this invention comprises a dried fruit product coated with a reaction product of a calcium compound and citric acid which has specific mole ratios of calcium to citrate and specific pH ranges.

Also included herein are dried fruits infused with sugar solids also coated with the unique calcium compound. These dried fruits are capable of being handled very efficiently with little clumping after standing for extended periods of time. Furthermore, the improved dried fruits of this invention maintain their softness and natural looks and are readily combined with dry cereals without the difficulty of the transfer of moisture to the cereal causing the cereal to become soggy, a condition not desired.

DISCLOSURE OF INVENTION

The present invention provides improved dried fruits for use in many consumable items and especially in cereal. A simple procedure is used by merely coating, partially or totally, the dried fruits with a special type of reaction product of calcium and citric acid.

The calcium citrate compounds used in this invention are reaction products of a calcium compound selected from the group consisting of calcium hydroxide, calcium oxide and calcium carbonate, with citric acid wherein said reaction product has a mole ratio of calcium to citric acid from 2.50:2 to 2.95 to 2, preferably 2.61:2 to 2.92:2 and pH value in a 1% water slurry of said reaction product about 4 to below 7, preferably about 4.0 to about 6.5 at 25° C.

In general, these calcium citrate crystals are prepared by spray drying a neutralization mixture prepared by neutralizing citric acid with a slurry of calcium carbonate or calcium oxide or calcium hydroxide in water, e.g., a slurry of calcium hydroxide under controlled conditions to assure the production of the present new calcium citrate salts. Temperature, slurry solid content, rate of mixing of reactants and agitation time before spray drying are critical parameters in determining the physical characteristics of final product.

In particular, the calcium citrate crystals are prepared by first neutralizing citric acid with calcium hydroxide while controlling the rate and conditions of the reaction as well as the degree of neutralization. In the present process, a calcium hydroxide aqueous slurry is reacted with a citric acid solution in water resulting in a strong exothermic reaction. The rate of reaction, concentration of reactants and varying conditions are all important factors in producing calcium citrate salts of the desired pH values, moisture content and particularly the desired particle size.

It is preferred to form two separate aqueous systems, one, a solution of citric acid and the second, a slurry of calcium hydroxide, calcium oxide or calcium carbonate and then mix the uniform slurry of calcium hydroxide or carbonate with the aqueous citric acid. The temperature of the mixture is not allowed to exceed about 60° C. The pH of the slurry so produced after thorough mixing should fall within the range of 4-6 and, if needed, should be adjusted to this range of pH. The slurry can be used as such or can be spray-dried or dried by other known drying steps.

The produced calcium citrate salt is very insoluble in water providing about 0.1% by weight solution at ambient temperature and slightly more soluble in hot water. During preparation of a batch and while waiting for spray drying of the batch the salts are present in the insoluble form, a slurry of tiny crystals which form aggregates of varying particle size ranging from 5 to 100 microns. In present experience, the best products are obtained by using the following conditions.

The solids level of the aqueous slurry of calcium citrate salt is maintained at 20-26% and preferably at 22-24% by weight based on anhydrous salt. The slurry temperature during spray drying is from 80°-90° F. To avoid gel formation in the aqueous slurry, especially at temperatures below 70° F., and recrystallization which can occur on prolonged storage, spray drying of the aqueous slurry is effected within about 4-5 hours after slurry preparation. The slurry is spray dried at an inlet temperature of from about 425° F. to about 460° F. to deliver a free-flowing white powder with a moisture content of less than 6% and bulk density of from about 0.3 to about 0.7 g/cc. Extensive mixing and especially homogenization prior to spray drying should be avoided since the aggregated particles of salt may be broken down into fine particles.

The calcium citrate crystals generally have the following characteristics:

| Bulk Density | 0.33–0.66 g/cc |
|---|---|
| Granulation | 95% through 100 mesh or 150 microns |
| Rotatap, 8 min. | 10% maximum through U.S. 400 mesh or 38 microns |
| pH (1% by weight solution) | 4.0–6.5 |
| Appearance | free-flowing, white powder |

These salts are neutral or slightly acidic and have a well-defined crystal size. The salt can be employed in the form of the anhydrous salt or the hydrated salt. In the hydrated form, the salt can usually contain up to about 13-15% by weight of water of hydration. In general, it is preferred to use the salt in lower hydrated form with less than about 10% by weight of water of hydration. Of course, the hydrated salt can be dried to any level of water of hydration using known methods. On standing, the salt does not undergo any loss or gain of water during storage.

The concentration of salt in these compositions can range from about 0.2% to about 22% by weight of the composition.

The calcium citrate employed in the present invention is in the form of small platelet crystals. The average length of the crystals is below 3.0 microns, preferably about 1.5 microns, width below 2.0 microns, preferably about 1.1 micron and thickness below 1 micron, preferably 0.1 to 0.2 micron. During preparation, clusters of these tiny platelets aggregate together to form spherical particles that range from about 5 to about 100 microns in diameter. Such clusters are readily separable by mechanical stirring in water or by merely allowing the clusters to stand in water for protracted periods of time, e.g., overnight at room temperature. A most efficient method for reducing the clusters to the individual platelets is the use of mechanical shear, as provided by a ball mill. Other mechanical stirring means that can be employed include homogenizers, microfluidizer or colloid mills, but the ball mill is more convenient particularly in the dry form.

When mixed with water, particularly at levels above about 10% by weight, the present spray-dried calcium citrate salt platelets cause a significant increase in the viscosity of the mixture. Thus, at 15% to 20% by weight the aqueous calcium citrate compositions are in the form of thick pastes resembling soft cheeses and margarines in consistency. At 20% and higher levels, the mixtures tend to solidify, especially when highly efficient mechanical shear is used.

In contrast with the results obtained with the special calcium citrate crystals used in this invention, commercial tricalcium dicitrate, whether in hydrated form (13% $H_2O$) or after rigorous drying, does not exhibit the same properties and is ineffective when tested side-by-side with the calcium citrate used in this invention, or as an additive to aqueous food composition. Without being bound to any theory of operation of the present invention, the phenomena observed with the present new salts is attributable to the particle size of the salt crystals, relying almost completely on the shape, number and geometrical arrangement of the calcium citrate crystals as they disperse in the new food compositions of this invention.

The amounts of calcium citrate reaction product of this invention to be coated on the dry fruit can vary considerably depending on the stickiness of the dried fruit to overcome a stickiness of the dried fruit amounts from 0.2% weight to as high as 5% weight and higher, preferred by 0.2 to about 2% of calcium citrate reaction products can be coated onto the dried fruit. The coating of the dried fruit can be partial or total to prevent clumping, significantly improve handling of the fruit and at the same time the fruits will remain soft, flavorful and of good color for longer periods of time.

The dried fruits which can be used in this invention can include whole fruit units and fruit pieces such as raisins, dates, apricots, prunes, cranberries, blueberries, currants, figs, apples, plums, bananas, pears, peaches, pineapple, cherries, strawberries and the like. These dried fruits can also be coated or infused with infusing material selected from the group consisting of hydrophillic carbohydrates and polyhydric alcohols of sufficient concentration to provide a significant deposition of the carbohydrate alcohol within the fruit. Among the suitable carbohydrates and polyhydric alcohols are those such as glycerol, propylene glycol, butylene glycol, corn syrup, honey, fructose, high fructose corn syrup, sorbitol, lactitol, mannitol and the like and combinations thereof. After the coating or infusion of the dried fruit, the resulting product can be coated, partially or totally, with the calcium citrate reaction product which will decrease the stickiness thus improving handling and maintain the dried fruit at a highly desirable softness levels for extended periods of time. A highly desirable technique in the utilization of infusion of the dried fruit is the use of crystalline hydrophillic carbohydrates such as fructose. As an example using fructose, after fructose has been infused into the dried fruit, crystalline fructose is coated with the calcium citrate reaction product and this combination is coated onto the infused dried fruit, especially desirable in raisins.

Another aspect of this invention, is the use of the novel and unique dried fruits and/or infused dried fruits of this invention in combination with dry cereals. It has been discovered that dried fruit coated with calcium citrate products of this invention admixed with dry cereal products when stored over prolonged periods of time, the cereal is not hydrated by the fruit to the degree of losing its crispness. Typically, cereal products such as processed flakes, pieces or extrudates of wheat, corn, bran, oats, rice and the like are Packaged having a low moisture content wherein the cereal is very dry to the touch and crisp. Normally under the conditions of admixing dried fruit with the dry cereal over a period of time, the moisture of the fruit transfers to the cereal and provides a soggy cereal as well as unduly hard and excessively chewy fruit. The use of the dried fruit of this invention significantly reduces the possibility of producing a soggy cereal and maintains a highly desirable softness of the dried fruit after several weeks of storage. By this invention, a simple technique is provided to produce highly desirable dried fruit containing cereals.

The following examples are provided to further illustrate the invention.

EXAMPLE 1

A calcium citrate sample was prepared by reacting 2763.8 lbs. of citric acid with 1600 lbs. calcium hydroxide (97-98% $Ca(OH)_2$ by analysis) in the presence of 1433 gallons of water. The mole ratio of calcium hydroxide to citric acid was very slightly less than 3:2, actually 2.92:2. The citric acid (Pfizer fine granular, food grade) was mixed in a large batch tank with 675 gallons of cold water. The calcium hydroxide (Mississippi Lime, hydrated lime food code) was mixed in a separate batch tank with 675 gallons of cold water. The calcium hydroxide slurry is then pumped into the citric acid solution at a rate to deliver the entire slurry in 10-15 minutes. It is necessary to have good agitation during the entire reaction and mixing process. The remaining 83 gallons of water is used to rinse the calcium hydroxide tank and transport lines. Due to the heat of reaction, the temperature of the resultant slurry was increased from an initial value of 15° C. (60° F.) to a maximum of 57° C. (134° F.). After the reaction is complete, the batch is cooled to 80-90° F. The final pH of this concentrated slurry 22% calcium citrate, (dry basis) should fall within the range 3.8-4.6 or can be adjusted up or down using the reacting ingredients. The slurry is then dried via spray drying utilizing a rotary wheel (7600 rpm). The outlet temperature was adjusted to 225° F and the inlet temperature was 450° F.

The calcium citrate powder obtained after spray drying was a free-flowing white powder with a moisture less than 6.0% and a bulk density in the range 0.33-0.65 g/cc. The pH of 1% slurry in water was 5.5. 95% of the powder passed through U.S. 200 mesh.

EXAMPLE 2

Experimental results are given below when anhydrous citric acid was neutralized using basic calcium salts (oxide or hydroxide). No calcium carbonate was used because of the large volumes of carbon dioxide that will be released during the reaction. The table gives the number of mols of calcium oxide or hydroxide added to 2 mols of citric acid and the pH of a 1% aqueous slurry of the resultant spray dried calcium citrate salt. (After reaction, agitation and spray drying as described in Example 1, 1 g of the resultant calcium citrate salt was dispersed in 100 ml distilled water for pH measurements.)

TABLE I

| MOLAR RATIO OF CITRIC:CALCIUM IN CALCIUM CITRATE | | |
|---|---|---|
| Citric Acid (Mol) | Calcium (Mol) | pH (1% Slurry in Water) |
| 2 | 2.375 | 3.95 |
| 2 | 2.613 | 4.04 |
| 2 | 2.850 | 4.64 |
| 2 | 2.910 | 5.25 |
| 2 | 2.910 | 5.33 |
| 2 | 2.92 | 5.5 |
| 2 | 2.99 | 7.28 |

Commercially available tricalcium citrate (3 calcium mols to 2 mols citric; $Ca_3 (Cit)_2$ shows a pH of 9-11 (a slurry in water at 25° C.). It is evident from the table that the composition range of our calcium citrate (slurry pH between 4 and 7) is $Ca2.5 (Cit)2$ to $Ca2.95 (Cit)_2$ for pH values in the range of 4-7.

The new calcium citrate salts of this invention are distinct from tricalcium citrate which is commercially available (Pfizer, Inc.) as is obvious from the following data:

| Commercial Tricalcium Citrate (Pfizer, Inc.) | | New Calcium Citrate Salts of the Invention |
|---|---|---|
| 10.66 | Moisture | Less than 5.5 |
| 17.64 | % Ca | 22.16 |
| 19.74 | % Ca (dry wt.) | 23.7 |
| 9-11 | pH | 4-7 |

EXAMPLE 3

50 g of raisins were coated with 3 different levels of calcium citrate of Example 1, namely 0.5%, 1 and 2% (wt./wt.). A sample of calcium citrate was ball-milled for 30 minutes before addition to the sticky raisins. The required weighed amounts of the finely divided calcium citrate were added to the 50 g of raisins in a 8 oz. glass jar. The caps were tightened and shaken by hand for 1 minute, followed by examining the coated raisins. In all cases free-flowing raisins were obtained. At the level of 0.5 and 1% calcium citrate coating, practically all the added anti-sticking agent was picked by the initially sticky surface of the raisins. When the level of calcium citrate is 2% on the raisins, part of the added calcium was not picked up by the raisins.

EXAMPLE 4

Whole soft dates (water activity of 0.60) were cut into ¼ inch cubes. The cut cubes were very sticky, when put together in a glass jar, a one piece cluster is obtained in a few minutes. However, if calcium citrate dry powder of Example 1, is added to these cubes, as a dusting, free flowing, non-sticky cubes were obtained without altering the softness and taste of these dates. A level of calcium citrate of 2% is ideal to coat and alter the stickiness of the cut dates (25 g cut date cubes and 0.5 g calcium citrate). A higher level of calcium citrate is needed for the cut dates which have no skin (as compared with uncut dates).

EXAMPLE 5

Dried apricots were cut into ¼ inch pieces (Aw=0.71). 25 grams of these sticky pieces were put in a 4 oz. glass jar to which was added 1% dry calcium citrate of Example 1. Upon agitation the apricots became lightly dusted and free flowing. The appearance and flavor were excellent.

Pitted Prunes were chopped (Aw=0.77) and found to be extremely sticky and unmanageable. The addition of 2% calcium citrate of Example 1 to 25 g in a 4 oz. jar resulted in a somewhat free flowing product which was much easier to handle.

EXAMPLE 6

In this Example, ball-milled, finely divided calcium citrate of Example 1 was mixed first with crystalline fructose. The level of calcium citrate on fructose was 2% (by weight).

25 grams samples of whole, uncoated raisins (select) were mixed in 4 oz. covered glass jars with 5% or 10% of their weight of the calcium citrate coated fructose prepared above.

In both cases, free-flowing, non-sticky raisins were obtained with significantly enhanced flow characteristics over the control starting material. Practically all the added crystalline fructose and the calcium citrate, non-sticking agent were picked by the surface of the raisins. At the 10% fructose-calcium citrate coating level a small amount of excess coating mixture (~10%) was obtained. To increase the fructose level above 8%, surface wetting of the whole raisins was necessary so that more fructose crystals can adhere to the surface. The calcium citrate was necessary to eliminate the sticky nature of the final products.

EXAMPLE 7

25g of chopped dates (same as in Example 3) was put in a 4 oz. covered glass jar and 0.25 g ball-milled calcium citrate powder of Example 1 was added to the sticky mass of chopped dates. A significantly improved flow characteristics was obvious in a matter of few minutes. To these calcium citrate coated chopped dates 3.75 g of crystalline fructose (surface treated with 2% calcium citrate) was added and mixed thoroughly, via rotation, with the chopped dates. A very uniformly coated, free-flowing, date cubes were obtained with significantly improved appearance, sweetness and without effecting its flavor profile.

EXAMPLE 8

200 g of whole raisins (select size) were added to 275 g of an 80% fructose syrup (a stock made up from 800 g crystalline fructose+200 g water). The fructose syrup was heated to 90° C. before the addition of the raisins. The raisins were fully immersed in the fructose syrup for a period of 10 minutes. After this surface treatment the raisins were strained on a mesh screen and allowed to drain. A very sticky wetted mass of syrup coated raisins was obtained that retained 28 g of the fructose syrup. At that point, 30 g of crystalline fructose coated with 2% calcium citrate of Example 1 was added to the sticky wetted raisins in a 32 oz. covered glass jar. The jar was rotated by hand for 3 minutes. After that treatment the sticky raisins mass was transferred to a free-flowing, non-sticky, sweeter and highly appealing fructose coated raisins. The visual appearance of these fructose coated raisins were much more appealing than the commercially available sucrose coated raisins. The fructose crystals were strongly held on the surface of the raisins by the fructose syrup and calcium citrate prevented the stickiness commonly expected from fructose crystals particularly in the presence of fructose syrup.

EXAMPLE 9

Raisins have been coated with honey and the resultant sticky mass was made free flowing by adding crystalline fructose and finely divided calcium citrate of Example 1 and crystalline sucrose and calcium citrate of Example 1 in the other set of experiments.

The honey coating procedures used are as follows: Pure Honey was mixed 8:1 with water (88.89% honey) and warmed to a temperature of 40° C. to reduce the viscosity thus allowing the solution to be sprayed on the raisins. Sufficient coating is sprayed on to take into account losses due to vessel coating. For these two samples, 33 grams of honey/water solution was sprayed on 900 g of select untreated raisins in a glass jar. The raisins and honey were rolled in the jar for about two minutes maintaining between 30° and 40° C. to evenly coat the honey on the surface of the raisins. For both samples, the level of coating deposited was determined by weighing the coated raisins and was found to be 3.0% or 2.7% pure honey on the raisins.

The two 900 grams honey coated raisin samples were then allowed to return to room temperature and each coated with the following flow systems to reduce the stickiness of the raisin:
1) 90 grams fructose coated with 3% calcium citrate of Example 1
2) 90 grams sucrose (fine granulation) coated with 3% calcium citrate of Example 1

The crystalline sugars were poured on the honey coated raisins in the jar and rotated until all the sugar/calcium citrate was adhering to the raisins and the raisins were free flowing.

EXAMPLE 10

100 grams of sucrose infused dried cranberries (Aw=0.515) were soaked in 150 grams of an 80% fructose syrup for one minute at 60° C. The fruit was then drained and 24 g of coating remained resulting in very sticky, hard to handle fruit. 15 g of a crystalline fructose calcium citrate blend (98:2) of Example 8 was put in a glass jar with the sticky fruit and agitated for 1 minute. The fruit was immediately free-flowing, easy to handle, with a greatly enhanced organoleptic profile. The fruit appeared more tender than before treatment and the added sweetness from the fructose coating blended well with the tartness of the cranberries.

EXAMPLE 11

A series of experiments were run similar to Example 8 using various periods of immersion of the raisins in 80% fructose syrup. The temperature of the syrup was also varied from room temperature to 90° C. Table II summarizes the experimental variables. Again, select raisins were used.

TABLE II

| Samples | Wt. of Raisins (g) | Temp. of Fructose Syrup (°C.) | Immersion Period (Hr.) | Syrup Retained by Raisins (g) | Calcium Citrate Crystalline Fructose of Example 6 Added (g) | Comments |
| --- | --- | --- | --- | --- | --- | --- |
| 1 | 400 | 90 | 1 | 65.9 | 60 | Free Flowing |
| 2 | 200 | 90 | 2 | 33 | 40 | Free Flowing |
| 3 | 200 | 90 | 6 | 45 | 30 | Free Flowing |
| 4 | 200 | 60 | 6 | 24 | 30 | Free Flowing |
| 5 | 200 | 25 (Amb.) | 16 | 17.8 | 60 | Free Flowing |
| 6 | 200 | 60 | 5 min. | 16.0 | 30 | Free Flowing |

In all the Samples (1–6) sweeter, free-flowing non-sticky raisins were obtained. The calcium citrate Provided the simple transfer of a very sticky mass to a very flowable product in a very short period. The flowability was checked with time (up to 2 months) at room temperature, in the presence of cereal flakes, as well as under controlled compression (weight load of 0.25 lb. per square inch). These compression tests resemble storage and packaging conditions of 550 lb. of raisins in a 52×57×54 inch containers. Under all these storage/handling conditions the fructose treated samples protected by the calcium citrate showed no signs of adhesion and the formation of sticking masses even under compression for weeks.

EXAMPLE 12

Raisins treated under Example 11 conditions of this invention were mixed with corn flakes (2.9% moisture) in glass jars. 14 g of raisins and 75 g of the flakes were added together in 32 oz. glass jars. The jars were closed and sealed with adhesive tapes. The contents were mixed thoroughly by rotating the jars slowly. All the jars were stored in a constant temperature room (100° F.) and a relative humidity of 30%. After two weeks at 100° F. the jars were opened and both the raisins and the flakes were evaluated organoleptically. As controls, untreated raisins (the starting material for this work) as well as a commercial sugar coated raisin (select grade) were used. The experiments were as follows:
- Control I: Uncoated select raisins
- Control II: Sucrose coated cereal raisins
- Variant I Raisins prepared according to Example 11, Sample 1
- Variant II Raisins prepared according to Example 11, Sample 4
- Variant III: Raisins prepared according to Example 11, Sample 6
- Variant IV: Raisins prepared according to Example 11, Sample 5

These evaluations showed that the raisins of this invention are much softer than the untreated raisins as well as the sugar coated commercial raisins. These controls were hard and chewy where as the calcium citrate-fructose treated raisins were soft, sweet and not chewy. All Variants I through IV were superior to Controls I and II. In all cases of the Variants, the cereal flakes were crunchy and very acceptable.

EXAMPLE 13

Raisins treated with calcium citrate/fructose of Example 8 were blended with bran flakes(4.1% moisture) in aluminum foil bags. 105 grams of the raisins were thoroughly mixed with 300 grams of bran flakes and sealed in aluminum foil bags (9×14 inch) and stored in a 100° F. room at 30% relative humidity. Two controls were used; the uncoated raisins as well as a sucrose-coated commercial raisins. The details of the experiments are as follows:
- Control I: Sugar coated Sun Maid raisins
- Control II: Uncoated Sun Maid select raisins
- Variant I: Select raisin calcium citrate/fructose treated of Example 11, Sample 1
- Variant II Raisins prepared according to Example 11, Sample 4
- Variant III Raisins prepared according to Example 11, Sample 6
- Variant IV: Raisins prepared according to Example 11, Sample 5

After a period of 30 days of storage at 100° F. and 30% relative humidity the Samples were brought to room temperature, opened and evaluated for the bran crispness and for the softness of the raisins. Experts in Cereal Technology were asked to rate these Samples. In all cases, the calcium citrate fructose treated raisins were significantly softer than the untreated starting raisins as well as the commercial sugar treated raisins. The controls were described as hard and chewy whereas the variants were characterized as soft. The degree of softness was slightly higher for the Sample 4 immersed in fructose syrup for 6 hours at 60° C.

EXAMPLE 14

Aqueous solutions of fructose and glycerol were prepared. Given amounts of raisin were soaked in the glycerol/fructose solution for various periods of time at different temperatures. At the end of the infusion period the treated raisins were drained and the weight of the infused glycerol/fructose as well as the weight of the sticky film on the raisins was determined from the weight difference before and after soaking. At that point the sticky raisins were treated with crystalline fructose containing 2% calcium citrate as made in Example 8 to the level of 15% of the original raisins weight, to produce a free flowing fructose/glycerol infused raisins. The different experimental data are summarized in Table III. The Table also includes the water activity (Aw) of the original glycerol/fructose aqueous soak solution.

TABLE III

THE AMOUNT OF INFUSION/COATING OF RAISINS FROM AQUEOUS GLYCEROL/FRUCTOSE SOLUTIONS

| Samples | Raisin Weight | Soak Solution Weight | Soak Solution Composition | Aw | Soak Time | Soak Temp. | Wt. Increase |
|---|---|---|---|---|---|---|---|
| 1 | 400.2 g | 800.00 g | 75% Fructose 12.5% Glycerol 12.5% Water | 0.406 | 1 hour | 60/65° C. | 10.0% |
| 1a | 400.4 g | 800.00 g | " | 0.406 | 5 hours | 60/65° C. | 10.2% |
| 1b | 400.5 g | 800.00 g | " | 0.406 | 15 hours | 60/65° C. | 10.1% |
| 1c | 400.3 g | 800.00 g | " | 0.406 | 24 hours | 60/65° C. | 10.7% |
| 1d | 1400.2 g | 3000.00 g | " | 0.406 | 1 Week | 40° C. | 10.4% |
| 2 | 400.0 g | 750.00 g | 69% Fructose 19% Glycerol 12% Water | 0.414 | 72 Hours | 40° C. | 11.6% |
| 3 | 600.2 g | 1400.00 g | 70% Fructose 10% Glycerol 20% Water | 0.558 | 24 Hours | 60/65° C. | 14.4% |
| 4 | 400.5 g | 913.00 g | 73% Fructose 6% Glycerol 21% Water | 0.593 | 24 Hours | 60/65° C. | 13.6% |

The data shows that the weight increase of the raisins after soaking (weight increase column) is more dependent on the composition of the fructose/glycerol aqueous solution, particularly its water activity (Aw). The differences are more significant when calculating the amount of material infused inside the raisins.

For glycerol/fructose solution of water activities of 0.406 and 0.414 there is very little infusion (1–2% only) irrespective of time and temperature. However, at higher water activities (>0.5) significantly higher infusion weights are noticed (8.8%). The raisins of Samples 3 and 4 are much softer than those produced under conditions 1 and 2 in Table III. The latter were also softer than the control.

In all cases provided in Table III the sticky raisins coated and infused by fructose and glycerol were transferred from a gummy mass to a free flowing coated raisins by simply adding crystalline fructose mixed with 2% of calcium citrate of Example 1.

EXAMPLE 15

Two 50 gram samples of raisins coated with 9.3% fructose syrup were placed in individual 8 oz. glass jars. To the sticky raisins in one jar was added 1% (based on the weight of the untreated raisin) of commercially available dry tricalcium dicitrate (Merck) as described in Table I of Example 2. In the other jar of sticky raisins was added 1% of the dry calcium citrate reaction product of Example 1. Both jars were capped and shaken by hand until all the powder was dispersed. This resulted in raisins which were free-flowing rather than a sticky mass. The flow properties of the raisins treated with the calcium citrate reaction product of this invention (Example 1) were better than those treated with commercially available tricalcium dicitrate.

What is claimed is:

1. A food product comprising a dried fruit coated with a finely divided reaction product of a calcium compound selected from the group consisting of calcium hydroxide, calcium oxide and calcium carbonate with citric acid wherein said reaction product has a mole ratio of calcium to citric acid from 2.5:2 to 2.95:2 and a pH value in a 1% water slurry of said reaction product from about 4 to below 7 at 25° C.

2. The food product of claim 1 wherein the calcium reaction product has a mole ratio of calcium to citric acid from 2.61:2 to 2.92:2.

3. The food product of claim 1 wherein the calcium reaction product has a pH value in a 1% water slurry of said reaction product from about 4.0 to about 6.5.

4. The food product of claim 3 wherein the dried fruit is raisins.

5. The food product of claim 3 wherein the raisins are honey coated.

6. The food product of claim 3 wherein the dried fruit is dates.

7. The food product of claim 3 wherein the dried fruit is apricots.

8. The food product of claim 3 wherein the dried fruit is prunes.

9. The food product of claim 3 wherein the dried fruit is cranberries.

10. A food product comprising the combination of a dry cereal and product of claim 3.

11. The food product of claim 10 wherein the dried fruit is selected from the group consisting of raisins, currants, dates, figs, apples, bananas, pears, peaches, pineapple, apricots, cranberries, plums, blueberries, cherries and strawberries.

12. The product of claim 11 wherein the cereal is selected from the group consisting of wheat, corn, bran, oats, rice and combinations thereof.

13. The product of claim 10 wherein the dried fruit is raisins.

14. The product of claim 10 wherein the dried fruit is raisins.

15. The product of claim 14 wherein the dried fruit is fructose infused raisins, coated with a finely divided reaction product of a calcium compound selected from the group consisting of calcium hydroxide, calcium oxide, and calcium carbonate wherein said reaction product has a mole ratio of calcium to citric acid from 2.61:2 to 2.92:2 and a pH value in a 1% water slurry of said reaction product from about 4.0 to about 6.5 and the dry cereal is raisins.

16. The food product of claim 1 wherein the dried fruit is selected from the group consisting of raisins, currants, dates, prunes, figs, apples, bananas, pears, peaches, pineapple, apricots, cranberries, plums, blueberries, cherries and strawberries.

17. A food product comprising the combination of a dry cereal and the product of claim 1.

18. The food product of claim 17 wherein the dried fruit is selected from the group consisting of raisins, currants, dates, figs, apples, bananas, pears, peaches, pineapple, apricots, cranberries, plums, blueberries, cherries and strawberries.

19. The product of claim 18 wherein the cereal is selected from the group consisting of wheat, corn, bran, oats, rice and combinations thereof.

20. The product of claim 17 wherein the dried fruit is raisins.

21. The product of claim 17, wherein the dried fruit is raisins.

22. The product of claim 17 wherein the dried fruit is fructose infused raisins.

23. The product of claim 22 wherein the dry cereal is bran.

24. The product of claim 22 wherein the dry cereal is corn flakes.

25. A food product comprising dried fruit infused with infusion material selected from the group consisting of a hydrophillic carbohydrate and a polyhydric alcohol and coated with a finely divided reaction product of a calcium compound selected from the group consisting of calcium hydroxide, calcium oxide and calcium carbonate with citric acid wherein said reaction product has a mole ratio of calcium to citric acid from 2.5:2 to 2.95:2 and a pH value in a 1% water slurry of said reaction product from about 4 to below 7 at 25° C.

26. The product of claim 25 wherein said calcium reaction product has a mole ratio of calcium to citric acid from 2.61:2 to 2.92:2 and a pH value in a 1% water slurry of said reaction product from about 4.0 to about 6.5.

27. The product of claim 26 wherein the infusing material is selected from the group consisting of glycerol, propylene, glycol, butylene glycol, corn syrup, honey, fructose, high fructose corn syrup, sorbitol, lactitol, mannitol and combinations thereof.

28. The product of claim 26 wherein the infusing material is fructose.

29. The product of claim 26 wherein the infusing material is a mixture of fructose and glycerol.

30. The product of claim 26 wherein the dried fruit is raisins, the hydrophillic carbohydrate is fructose and the raisins are coated with fructose coated with said calcium citrate reaction product.

31. The product of claim 25 wherein the infusing material is selected from the group consisting of glycerol, propylene, glycol, butylene glycol, corn syrup, honey, fructose, high fructose corn syrup, sorbitol, lactitol, mannitol and combinations thereof.

32. The product of claim 25 wherein the infusing material is fructose.

33. The product of claim 25 wherein the infusing material is a mixture of fructose and glycerol.

34. The product of claim 25 wherein the hydrophillic carbohydrate is fructose coated with the calcium citrate reaction product.

35. The product of claim 25 wherein the dried fruit is selected from the group consisting of raisins, currants, dates, figs, apples, bananas, pears, peaches, pineapple, apricots, cranberries, plums, blueberries, cherries and strawberries.

36. The product of claim 25 wherein the dried fruit is raisins.

37. The product of claim 25 wherein the dried fruit is raisins and the hydrophillic carbohydrate is fructose.

* * * * *